United States Patent
Van Reisen

[15] 3,704,545
[45] Dec. 5, 1972

[54] PLASTIC CONTAINER FOR BULBOUS PLANTS

[72] Inventor: George Leonardus Johannes Van Reisen, Sassenheim, Netherlands

[73] Assignee: George Van Zonneveld, Loosterweg, Voorhout, Netherlands

[22] Filed: April 21, 1970

[21] Appl. No.: 30,426

[52] U.S. Cl. ...............7/34.11, 220/60 R, 206/46 PL
[51] Int. Cl. ..............................................A01g 9/02
[58] Field of Search............47/34.11, 34, 37, DIG. 7; 220/60 R

[56] References Cited

UNITED STATES PATENTS

| | | | |
|---|---|---|---|
| 3,307,602 | 3/1967 | Boster | 220/60 R |
| 3,314,194 | 4/1967 | Halleck | 47/34.11 |
| 3,392,873 | 7/1968 | Old | 220/60 R |
| 3,419,181 | 12/1968 | Stec | 220/60 R |
| 3,531,013 | 9/1970 | Hammes | 220/60 R |
| 2,930,162 | 3/1960 | Mulford | 47/37 |
| 2,632,286 | 3/1953 | Newhall | 47/34.11 X |
| 1,959,510 | 5/1934 | Van Waveren | 47/34.11 |
| 2,828,789 | 4/1958 | Groendyk et al. | 47/37 UX |

Primary Examiner—Robert E. Bagwill
Attorney—Woodhams, Blanchard and Flynn

[57] ABSTRACT

A plastic container for bulbous plants is disclosed comprising an opaque pot for the bulb and the surrounding earth, a resilient coupling rosette that acts as a lid for the pot and retains the bulb and the earth in the pot at any moment and a transparent cover mounted or mountable over the pot and — if mounted — coupled to the rosette and thus directly to the pot.

The coupling rosette preferably has a central part provided with a growing aperture.

The transparent cover both acts as a protection of the green parts of the bulbous plant during transport and as a hot house after delivery at the customer.

In a preferred embodiment the couplings between both the pot and the rosette and between the rosette and the cover are rotationally symmetrical in order to be mechanically achievable.

The container is also useful without cover.

8 Claims, 9 Drawing Figures

PATENTED DEC 5 1972 3,704,545

INVENTOR
GEORGE LEONARDUS JOHANNES VAN REISEN
BY
Woodhams, Blanchard & Flynn
ATTORNEYS

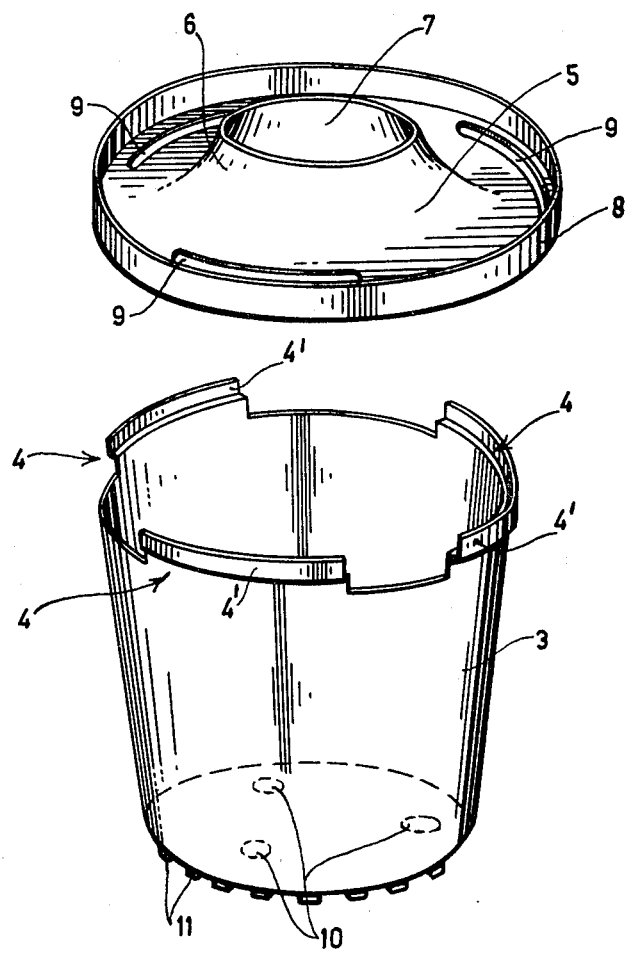
FIG: 2.

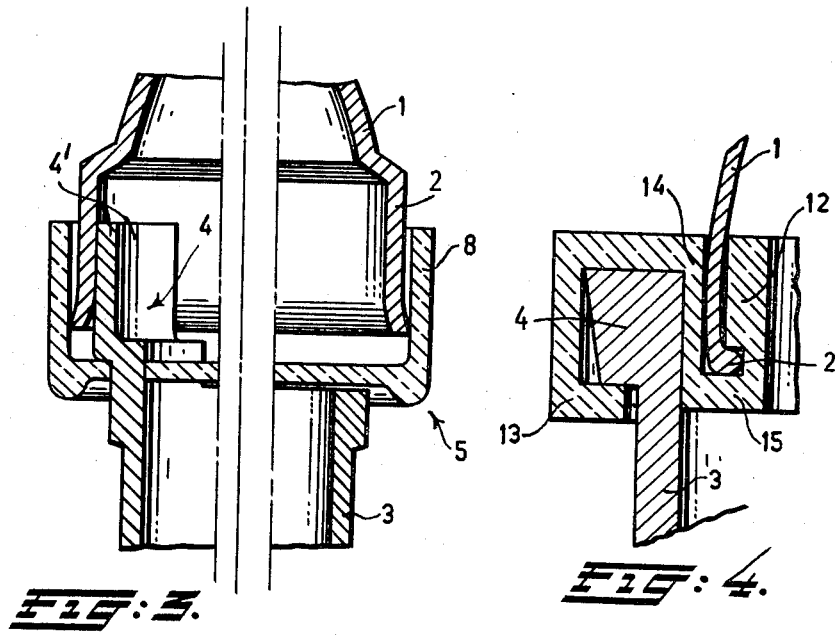
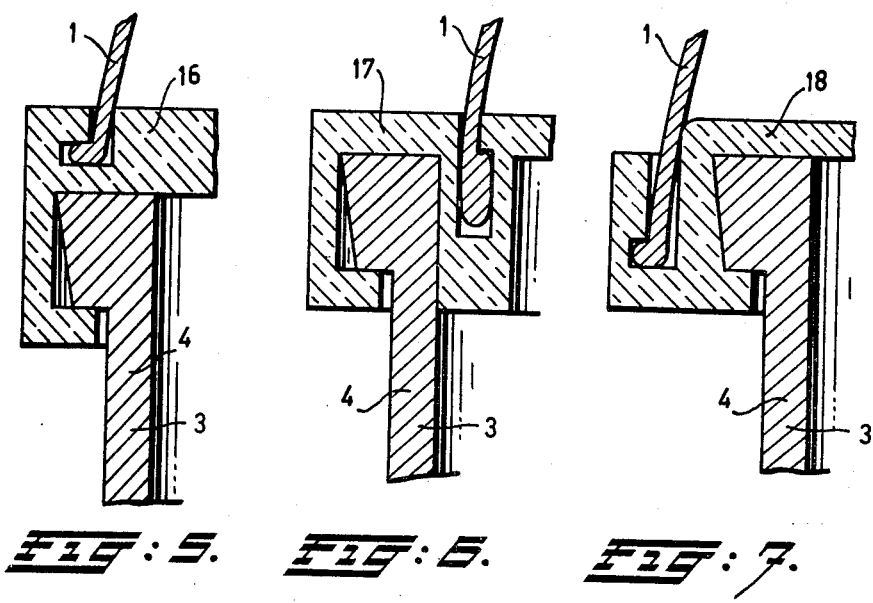

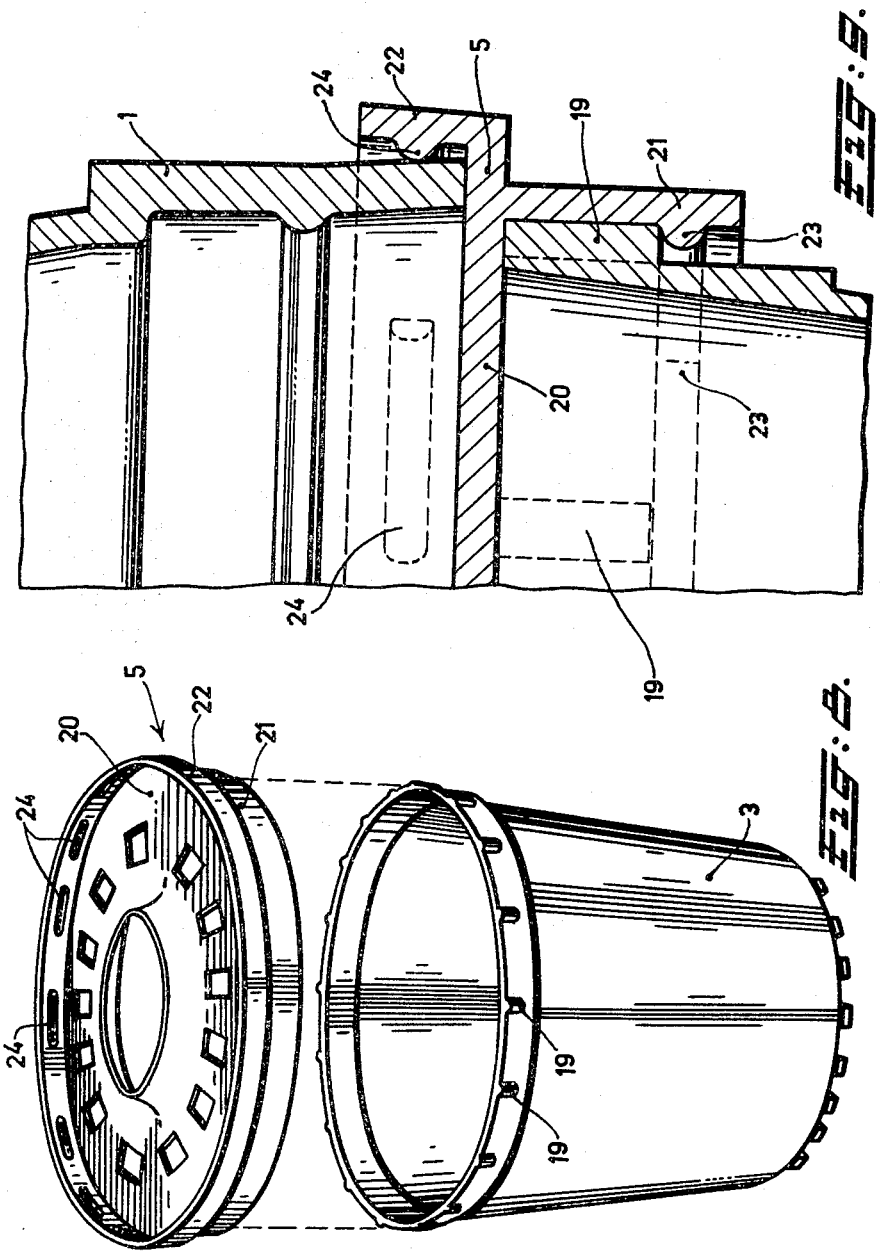

PLASTIC CONTAINER FOR BULBOUS PLANTS

BACKGROUND OF THE INVENTION

The invention relates to a preferably rotationally symmetrical plastic container for bulbous plants comprising a pot and a transparent rigid cover. There is a market for a rigid packing of the aforementioned type which meets the following requirements:

- the packing should in the first place enclose the sometimes already slightly sprouted bulbous plant to protect it against shock and impact;
- the packing should during transport ensure that the bulb and the earth clinging thereto are retained and do not fall from the pot into the rigid cover;
- the rigid cover should effectively but detachably be secured to the pot;
- the packing should also be useful for the buyer;
- the packing should be capable of being assembled in the nursery without touching the bulbous plant by the hands.

BRIEF SUMMARY OF THE INVENTION

The present invention aims at the provision of such a container, which container is characterized in that a flexible coupling member is provided which couples the pot and the cover and which is essentially more flexible than the cover and the pot and adapts itself thereto during the coupling.

Such a coupling member is advantageous in that the cover can be positively safely placed on the pot and retained thereon due to the elasticity of the member, even when a filled packing in the shape of a container with earth and bulbous plant is lifted by the cover. This is not possible with a combination of a rigid plastic pot and a rigid transparent cover, since the required reproducible tolerance cannot be achieved in practice.

The use of the elastic coupling member allows deviations of the dimensions of cover and/or pot, because the member adapts itself to the dimensions of the rims at the open ends of the cover and the pot.

Preferably the coupling member is a spatially profiled and efficiently curved connecting rosette with a central opening allowing the growth of the plant.

Such an annular rosette is distinguished in that the central opening ensures that the part of the assembly consisting of the pot together with the associated annular rosette remains useful for the buyer. The green parts of the bulbous plant can grow through the central opening and the bulb is retained in the pot when possibly the plant becomes top heavy. Moreover the earth remains covered in the pot.

It is evident that the transparent cover can also be used as a small hot house, for which purpose the cover at the upper side is preferably provided with a number of de-aeration apertures. The pot may at the underside be provided with legs and/or apertures.

The invention relates also to a plastic pot with coupling member, wherein the transparent cover is omitted. The advantage of such a pot has been indicated already hereinbefore.

Preferably the elastical coupling member is coupled to the pot by means of standing lips, forming part of the pot, and recesses situated thereinbetween in the upper rim, while the coupling member has slits fitting the lips.

Such a coupling between the rosette and the pot appears to be usable, since the rosette can be easily secured on the pot and only loosened therefrom by a radial deformation, so that the growing plant cannot press the rosette from the pot.

The lower rim of the rigid cover can be disposed and fixed in the annulus between the outer rim of the rosette and the standing lips of the pot. The elasticity of the rosette ensures a positive fixation of the lower rim of the cover.

It is also possible to construct a container or pot of the aforementioned type in such a way that the pot has vertical ridges near the upper edge that the coupling ring has on either side of the flat central plate with central opening a rim edge that the lower rim edge has at its lower end an inwardly directed annular protrusion, which rim edge has a height as measured unto this annular protrusion equal to the height of the vertical ridges, and that the upper rim edge has in the proximity of its upper end a continuous or discontinuous annular protrusion which is capable of cooperation with the cover.

This embodiment is advantageous in that the coupling is rotationally symmetrical and can be mechanically achieved since no special positioning of the pot and the coupling member with respect to each other is required.

BRIEF DESCRIPTION OF THE DRAWING

FIG. 2 is a perspective view of the pot according to FIG. 1, the rosette being detached from the pot;

FIGS. 3 to 7 show in outline cross sections through the area of the coupling between the pot, the cover and the coupling member according to a number of embodiments of the invention; and FIGS. 8 and 9 show a perspective view and a fragmentary section of another embodiment of the invention.

DESCRIPTION

Figure 1:
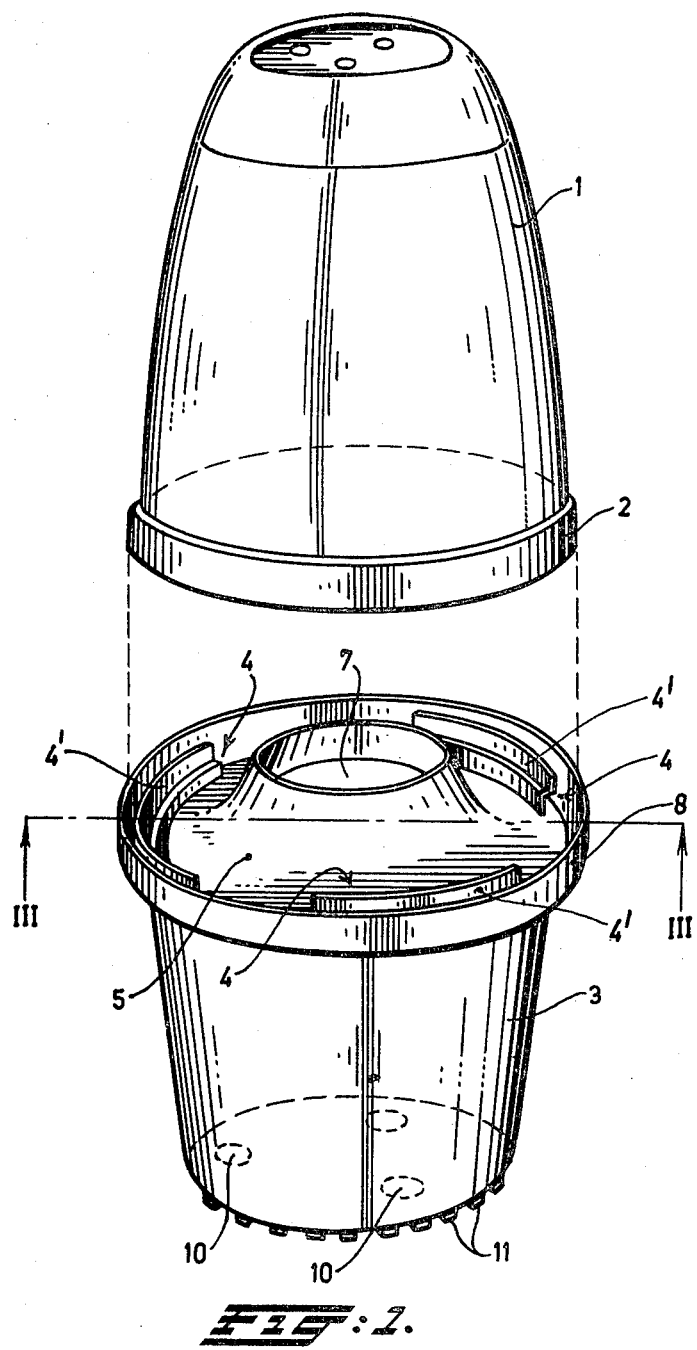
FIG. 1 shows a perspective view of a pot carrying a rosette and of a detached cover according to an embodiment of the invention.

In FIG. 1 there is depicted a container for a bulbous plant, e.g. a hyacinth, consisting of a transparent cup-shaped plastic cover 1 (with enforced lower rim 2) and an opaque rigid plastic pot 3. Parts of the upper rim of the pot are recessed so that the standing lips 4 remain. As appears from FIG. 2 the rim of the pot 3 has a stepped construction as seen in vertical cross section. The container according to FIG. 1 comprises further a coupling member 5, consisting of flexible material, preferably plastic material. In the depicted embodiment the member 5 consists of a rosette the central part 6 of which is bulged and provided with a central aperture 7. This aperture 7 constitutes the opening allowing the growth of the green portion of the bulbous plant. The rosette 5 has a rimlike edge 8 and is provided with slits 9. The slits 9 and the lips 4 are constructed in such a way that they can engage each other, the describing circle of the outer edge of the slits having a slightly smaller diameter than the describing circle of the outer edge of the standing lips 4. Due to a minor deformation of the lips 4 and/or of the rosette 5 the lips 4 fit into the slits 9 and snap thereupon by their stepped upper ends 4' over the outer edges of the slits 9. The inner and outer diameter of the enforced rim 2 of the cover 1 are selected in such a way that this enforced rim fits the slot between the rim 8 of the rosette and the standing lips 4 of the pot. Preferably the enforced rim 2 bulges slightly outwards on its underside (not shown).

In use the pot 3 with the rosette 5 can be applied in assembled condition in the nursery. In that case the pot is filled with earth and a bulb is planted in the earth directly under the central opening 7. Water can be supplied through the slits 9, while the excess water can flow off e.g. through the discharge holes 10. Preferably the pot is to that end provided with legs or other protrusions 11, so that when the pot is in the upright position the apertures 10 are not obstructed.

As soon as the bulbous plants, like hyacinths, have been thriven and should be delivered the packing is completed by pressing the cover 1 on the pot. Such a simple packing operation is the more so of interest, since the delivery period, in which millions of pots should be dispatched, is very short, so that a saving in time on packing is very important. Notwithstanding this time saving way of packing the delivered product is very well protected and the buyer can even use the cover 1 as a hot house. The buyer can afterwards also use the pot 3 with rosette 5 for other purposes (like propagating other plants by cuttings). As soon as the green portion of the bulbous or tuberous plant has reached the top of the cover 1 the latter can be detached.

FIG. 2 shows distinctly the construction of the elastical flexible plastic rosette 5 which is disposed on the pot 3 (which can be made of hard plastic).

A number of variants are possible within the scope of the invention for the coupling of the pot 3 and the coupling member 5 on the one hand and of the coupling member 5 and the cover 1 on the other hand.

In FIG. 3 a container according to FIG. 1 and 2 is represented once more, but this time a cross section thereof according to the line III—III of FIG. 1 is shown.

In FIG. 4 a section is represented corresponding to that at the left half of FIG. 3. In this embodiment of the coupling member 12 it has an inner and outer diameter which do not differ much from the diameter of the rim of the pot 3. According to this embodiment no central aperture is provided but the earth in the pot remains uncovered. Nevertheless an adequate coupling is effected between the cover 1 and the pot 3. The circular ring 12 which initially is clamped around the pot 3 causes, due to its annular form, a sufficient rigidity of the wall parts 13, 14 and 15. Since the ring 12 is made of a resilient material it may be dimensioned in such a way that it fits closely around the rims 4 and 2 of the pot and the cover.

Analogous solutions are indicated in the FIGS. 5, 6 and 7, which are self explanatory. The coupling member 16, 17, 18 respectively, can be constructed as a ring or rosette with a central opening allowing the growth.

In dependence on the embodiment of the container or pot the coupling member 12, 16, 17 or 18 can be clamped on the rim of the pot before or after planting the bulbous plants. In case this clamping is effected during the packing operation, which directly precedes dispatch, the elastical coupling member can also simultaneously with the cover 1 be fixed on the pot 3. This is possible notably when a member 12 is used which has no central opening.

As appears from the FIGS. 8 and 9 according to another embodiment the pot 3 has vertical ridges 19 and the coupling member 5 has on either side of the plate 20 of the rosette with central opening a rim edge 21, 22 respectively. The lower rim edge 21 has on its underside an annular protrusion 23, while the height of the edge 21 as measured unto this annular protrusion 23 is equal to the height of the vertical ridges 19.

The upper rim edge 22 has in the vicinity of its upper end a discontinuous annular protrusion 24 which may cooperate with the cover 1.

The annular protrusion 23 cooperates with the ridges 19 to create a snap-fit between the pot 3 and the coupling member 5. There is thus obtained a rotationally symmetrical coupling which is mechanically applied to the pot.

What I claim is:

1. A container assembly for flower bulbs, comprising:
   a plastic pot adapted to have at least one flower bulb disposed therein, said pot having rim means provided adjacent the upper free edge thereof;
   said rim means of said pot having a plurality of spaced recesses formed therein to thereby result in formation of a plurality of upwardly extending lips having a stepped configuration;
   a plastic coupling member securable to said pot adjacent the upper edge thereof for substantially closing said pot to retain said flower bulb therein, said coupling member having central opening means therethrough for permitting growth of said flower bulb;
   said coupling member having first means disposed adjacent the periphery thereof for engagement with the rim means of said pot for creating a snap-fit between said coupling member and said pot, whereby said coupling member is securely but releasably connected to said pot adjacent the upper free edge thereof;
   said first means comprising a plurality of slits formed in said coupling member and disposed for coaction with the upstanding lips of said pot, whereby one of said pot and coupling member is flexed relative to the other to permit said upstanding lips to be inserted into and through said slits until the stepped configuration of said lips passes sufficiently through said slits to create a snap-fit between said coupling member and said pot;
   a transparent plastic cover member adapted to be secured to said coupling member on the side thereof opposite said pot, said cover member having a lower free edge defining a downwardly directed opening; and
   said coupling member having second means disposed for engagement with the lower free edge of said cover member for securely but releasably connecting said cover member to said coupling member.

2. A container according to claim 1, wherein said coupling member has a central wall portion extending across the open end of said pot and having said central opening formed therein, said slits being formed in said central wall portion;
   said second means including a flange fixedly secured to said central wall portion and extending substantially transversely therefrom in a direction away from said pot, said flange being positioned adjacent to but slightly spaced from said slits to define a narrow clearance space between said flange and the upper free ends of said lips when the lips are inserted through said slits; and said cover member having the lower free edge thereof inserted into the narrow clearance space between said flange and the upper free ends of said lips, the lower free edge of said cover member being clampingly engaged and held by said flange and the upper ends of said lips.

3. A container according to claim 1, wherein said coupling member is substantially annular and said second means includes an annular axially extending flange having a diameter slightly larger than the diameter of said rim means;

said coupling member also having an annular central wall fixedly secured to and extending across said annular flange, said central wall having said central opening means formed therethrough substantially at the center thereof;

said plurality of slits comprising elongated arcute slits formed in said central wall, said slits being concentric with the longitudinally extending axis of said pot and said coupling member, said slits being disposed adjacent but spaced slightly inwardly from said annular flange and being adapted to permit the lip portions on said pot to be inserted therethrough due to flexing of said coupling member relative to said pot, whereby insertion of said lip portions through said slits causes the upper stepped part of the lip portions to create a snap-fit between said pot and said coupling member, the upper stepped part of said arcuate lips being disposed closely adjacent but slightly spaced from sand annular flange to create a narrow annular space therebetween; and said cover member having an inverted cup-shape with the lower edge of said cover member being substantially annular and being disposed within the narrow annular space defined between said annular flange and the upper stepped part of said lip portions, the lower annular edge of said cover member being clampingly held between said annular flange and said lip portions.

4. A container assembly for flower bulbs, comprising:

a plastic pot adapted to have at least one flower bulb disposed therein, said pot having rim means provided adjacent the upper free edge thereof;

a plastic coupling member securable to said pot adjacent the upper edge thereof for substantially closing said pot to retain said flower bulb therein, said coupling member having central opening means therethrough for permitting growth of said flower bulb;

said coupling member including a central wall portion adapted to be disposed across the open upper end of said pot, said central wall portion having said central opening means extending therethrough;

said coupling member having first means disposed adjacent the periphery thereof for engagement with the rim means of said pot for creating a snap-fit between said coupling member and said pot, whereby said coupling member is securely but releasably connected to said pot adjacent the upper free edge thereof;

said first means comprising a first axially extending annular flange fixedly connected to said central wall portion and extending axially from one side thereof, said first annular flange being adapted to be disposed in surrounding relationship to the upper edge of said pot and having an inwardly directed annular projection formed thereon adjacent the lower edge thereof, and the rim means on the upper edge of said pot having in the proximity of its upper free edge a plurality of circumferentially spaced vertical ridges projecting radially outwardly of said pot, the vertical height of said ridges being substantially equal to the vertical spacing between said center wall portion and said annular projection, whereby insertion of the upper edge of said pot into said first annular flange causes resilient deformation therebetween so that said vertical ridges move past said annular projection and into the space between said annular projection and said central wall for creating a snap-fit between said pot and said coupling member;

a transparent plastic cover member adapted to be secured to said coupling member on the side thereof opposite said pot, said cover member having a lower free edge defining a downwardly directed opening; and said coupling member having second means disposed for engagement with the lower free edge of said cover member for securely but releasably connecting said cover member to said coupling member;

said second means comprising a second annular flange fixedly secured to said central wall portion and projecting axially upwardly therefrom on the side thereof opposite said first annular flange, said second annular flange having radially inwardly directed annular protrusion means disposed for engagement with the lower edge of said cover member when the lower edge of said cover member is forcible inserted into said second annular flange, the lower free edge of said cover member being disposed substantially in abutting engagement with said central wall portion.

5. A container assembly for flower bulbs, comprising:

a plastic pot adapted to have at least one flower bulb disposed therein, said pot having rim means provided adjacent the upper free edge thereof;

a plastic coupling member securable to said pot adjacent the upper edge thereof for substantially closing said pot to retain said flower bulb therein, said coupling member having central opening means therethrough for permitting growth of said flower bulb;

said coupling member including a central wall portion adapted to extend across and substantially close the upper open end of said pot, said central wall portion having said central opening means extending therethrough;

first means coacting between the periphery of said coupling member and the rim means of said pot for creating a snap-fit therebetween, whereby said coupling member is securely but releasably connected to said pot adjacent the upper free edge thereof;

said first means including an annular flange fixedly secured to said central wall portion and extending axially therefrom in a direction toward said pot, said annular flange having an internal diameter permitting said annular flange to be disposed in surrounding relationship to the upper edge of said pot;

said first means also including a projecting annular rib fixedly secured to one of said annular flange and rim means and projecting toward the other of said annular flange and rim means, and a plurality of spaced projections fixedly secured to the other of said annular flange and rim means and projecting toward said one annular flange and rim means, said annular rib or projections as fixedly secured to said annular flange being disposed downwardly from said central wall portion to create a space therebetween adapted to receive therein the other of said annular rib and projections to create a snap-fit between said coupling member and said pot;

a transparent plastic cover member adapted to be secured to said coupling member on the side thereof opposite said pot, said cover member having a lower free edge defining a downwardly directed opening; and said coupling member having second means disposed for engagement with the lower free edge of said cover member for securely but releasably connecting said cover member to said coupling member.

6. A container assembly for permitting storing, shipping and growing of flower bulbs, comprising:

an upwardly opening cup-shaped plastic pot adapted to have at least one flower bulb disposed therein, said pot having annular rim means adjacent the upper free edge thereof and defining an upwardly directed opening;

an annular plastic coupling member securable to said pot adjacent the upper edge thereof for substantially closing said pot to retain said flower bulb therein, said coupling member having a central wall portion adapted to extend across and substantially close the upper end of said pot, said central wall portion having a central opening therethrough for permitting growth of said flower bulb;

said coupling member further having a ringlike annular flange fixedly secured to and surrounding said central wall portion and extending axially downwardly therefrom in a direction toward said pot;

cooperating means including opposed and coacting first and second protrusion means on said rim means and said annular flange, respectively, for creating a snap-fit between said coupling member and said pot, whereby said coupling member is securely but releasably connected to said pot adjacent the upper free edge thereof;

a transparent plastic cover member adapted to be secured to said coupling member on the side thereof opposite said pot, said cover member comprising a vertically elongated, inverted, cup-shaped member having a lower free edge defining a downwardly directed opening; and said cover member having a cross-sectional size and configuration adjacent the open end thereof similar to the cross-sectional size and configuration of the pot adjacent its open end, said cover member also having vent opening means extending through the wall thereof;

said coupling member having connecting means disposed for engagement with the lower free edge of said cover member for securely but releasably connecting said cover member to said coupling member.

7. A container assembly according to claim 6, wherein said annular flange is adapted to be disposed in surrounding relationship to the rim means on the upper end of said pot and has said second protrusion means formed thereon and spaced axially downwardly from said central wall portion, said second protrusion means projecting radially inwardly of said annular flange; and said rim means having said first protrusion means formed thereon and radially outwardly directed directly adjacent the upper free edge of said pot, said first protrusion means being adapted to be disposed within said second annular flange in the axial space between said central wall portion and said second protrusion means for creating a snap-fit between said coupling member and said pot;

one of said first and second protrusion means comprising a substantially continuous ringlike element, the other of said first and second protrusion means comprising a plurality of separated portions which are angularly spaced from one another.

8. A container assembly according to claim 7, wherein said connecting means comprises a second annular flange fixedly secured to and surrounding said central wall portion and extending upwardly therefrom in a direction away from said pot, said second annular flange having a plurality of angular spaced, radially inwardly directed protrusion means disposed for engagement with the lower edge of said cover when said cover member edge is forceably inserted into said second annular flange, the lower free edge of said cover member being disposed substantially in abutting engagement with said central wall portion.

* * * * *